Patented Mar. 17, 1931

1,797,104

UNITED STATES PATENT OFFICE

KARL SCHIRMACHER AND ERNST FISCHER, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING HYDROXYTHIONAPHTHENES

No Drawing. Application filed September 27, 1928, Serial No. 308,872, and in Germany October 17, 1927.

The present invention relates to a process for preparing hydroxythionaphthenes.

This invention is based on the discovery that hydroxythionaphthenes can be obtained with an excellent yield from compounds of the following formula:

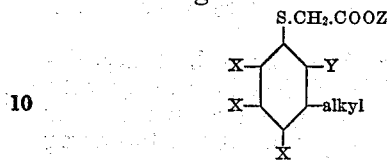

wherein X may be hydrogen, alkyl or halogen, Y may stand for CN, COOH, COO-metal, and Z for hydrogen or a metal by heating them with water to a temperature of between 100° C. and 200° C., preferably one of 180° C., that is to say, by using such ortho-carboxy-thioglycolic acids, or salts thereof, or ortho-cyano-thioglycolic acids as contain in ortho-position to the carboxyl-or nitrile-group a further substituent, particularly an alkyl residue. If there is no further substituent in ortho-position to the cyanogen group, no hydroxythionaphthene is formed.

In comparison with the hitherto known pertinent methods, the transformation of the ortho-cyanothioglycolic acids of the benzene series, substituted in ortho-position to the cyanogen group, into the corresponding hydroxythionaphthenes by a single operation and only with water, involves a considerable technical progress.

The following examples illustrate our invention, but they are not intended to limit it thereto.

1. 5 parts by weight of 3-methyl-5-chlorophenyl-2-carboxy-1-thioglycolic acid of the formula:

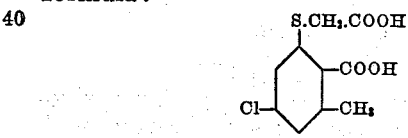

are heated with 40 parts of water for 4 hours to 170° C.–180° C.; the resulting 4-methyl-6-chloro-hydroxythionaphthene of the formula:

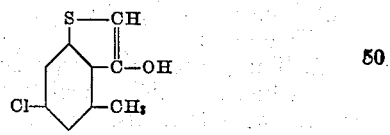

is purified by first treating it with a cold solution of sodium carbonate, then dissolving it in a diluted alcoholic caustic soda solution, filtering and precipitating it with diluted hydrochloric acid.

2. 7 parts of 3.6-dimethyl-5-chlorophenyl-2-carboxy-1-thioglycolic acid of the formula:

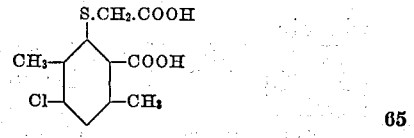

are neutralized with sodium carbonate in 40 parts of water and then heated for several hours to a temperature of 170° C. The reaction product is warmed with diluted hydrochloric acid, filtered by suction, treated with a cold soda solution and reprecipitated from an alcoholic caustic soda solution. Thus, the 4.7-dimethyl-6-chloro-hydroxythionaphthene of the formula:

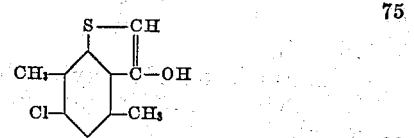

is obtained with a good yield and in a very pure state.

3. 5 parts of 2-cyano-3-methyl-5-chlorophenylthioglycolic acid of the formula:

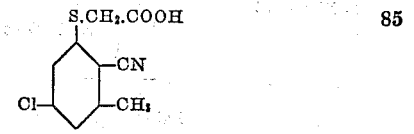

are heated with 30 parts of water for several hours to a temperature of 180° C.; the reaction product is filtered by suction, treated with cold soda solution and re-precipitated from an alcoholic caustic soda solution. Thus, the 4-methyl-6-chloro-hydroxythionaphthene is obtained with a good yield and in a very pure state. It is identical with the product obtained according to Example 1.

4. 5 parts of 2-cyano-3.6-dimethyl-5-chlorophenylthioglycolic acid of the formula:

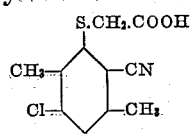

are neutralized with sodium carbonate in 30 parts of water and heated for 4 hours to a temperature of between 170° C. and 180° C. The reaction product is further treated as described in Example 3, whereby the 4.7-dimethyl-6-chloro-hydroxythionaphthene is obtained. It is identical with the product obtained according to Example 2.

We claim:

1. The process of preparing hydroxythionaphthenes, which consists in heating with water at a temperature of between 100° C. and 200° C. a compound of the following formula:

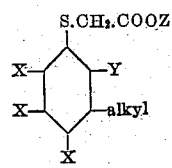

wherein
X stands for H, alkyl or halogen, Y for CN, COOH, COO-metal, and Z for H or a metal.

2. The process of preparing hydroxythionaphthenes, which consists in heating with water for several hours at a temperature of about 180° C. a compound of the following formula:

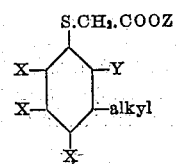

wherein
X stands for H, alkyl or halogen, Y for CN, COOH, COO-metal, and Z for H or a metal.

3. The process of preparing hydroxythionaphthenes, which consists in heating with water at a temperature of between 100° C. and 200° C. a compound of the following formula:

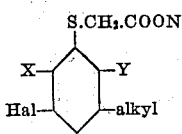

wherein
X stands for H or alkyl, Y for CN, COOH, COONa, and Hal for halogen.

4. The process of preparing hydroxythionaphthenes, which consists in heating with water for several hours at a temperature of about 180° C. a compound of the following formula:

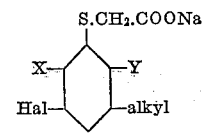

wherein
X stands for H or alkyl, Y for CN, COOH, COONa, and Hal for halogen.

5. The process of preparing hydroxythionaphthenes, which consists in heating with water at a temperature of between 100° C. and 200° C. a compound of the following formula:

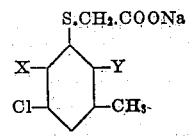

wherein
X stands for H or $CH_3$, Y for CN, COOH or COONa.

6. The process of preparing hydroxythionaphthenes, which consists in heating with water for several hours at a temperature of about 180° C. a compound of the following formula:

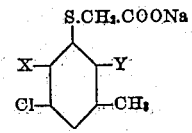

wherein
X stands for H or $CH_3$, Y for CN, COOH or COONa.

7. The process of preparing hydroxythionaphthenes, which consists in heating with water at a temperature of between 100° C. and 200° C. a compound of the following formula:

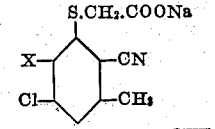

wherein X stands for H or $CH_3$.

8. The process of preparing hydroxythionaphthenes, which consists in heating with water for several hours at a temperature of about 180° C. a compound of the following formula:

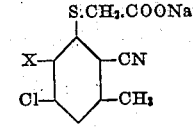

wherein X stands for H or $CH_3$.

9. The process of preparing hydroxythionaphthenes, which consists in heating with water at a temperature of between 100° C.

and 200° C. a compound of the following formula:
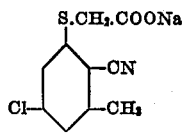
10. The process of preparing hydroxythionaphthenes, which consists in heating with water for several hours at a temperature of about 180° C. a compound of the following formula:
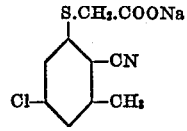
In testimony whereof, we affix our signatures.
KARL SCHIRMACHER.
ERNST FISCHER.